Patented Jan. 1, 1924.

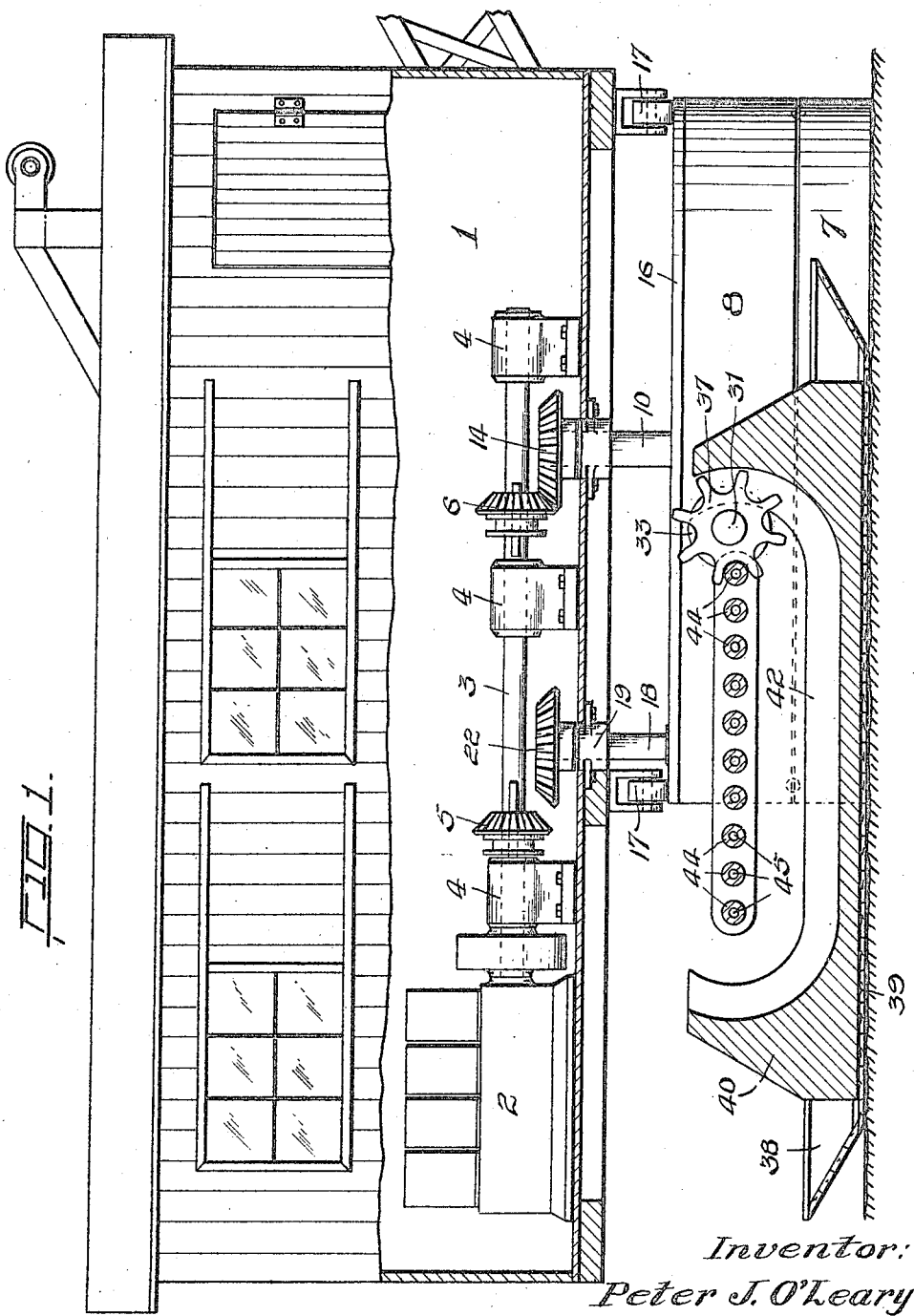

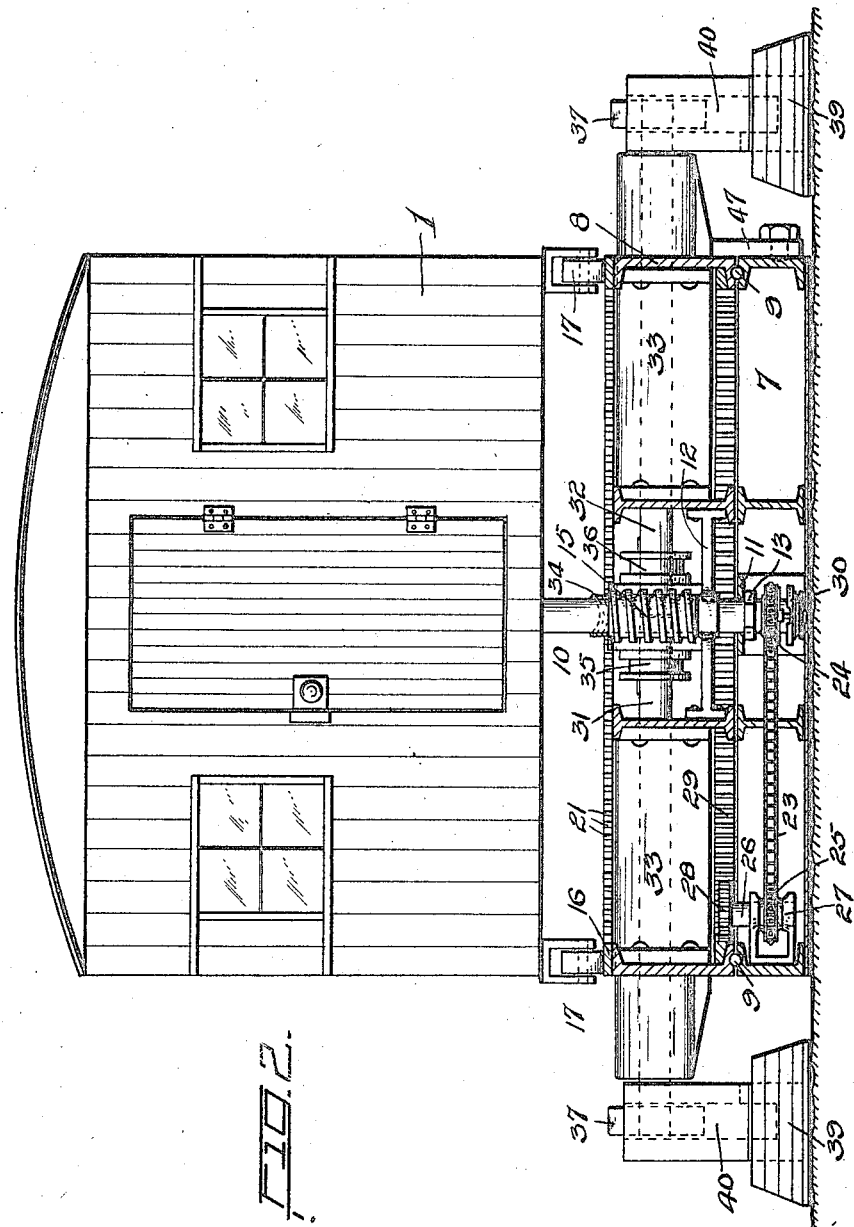

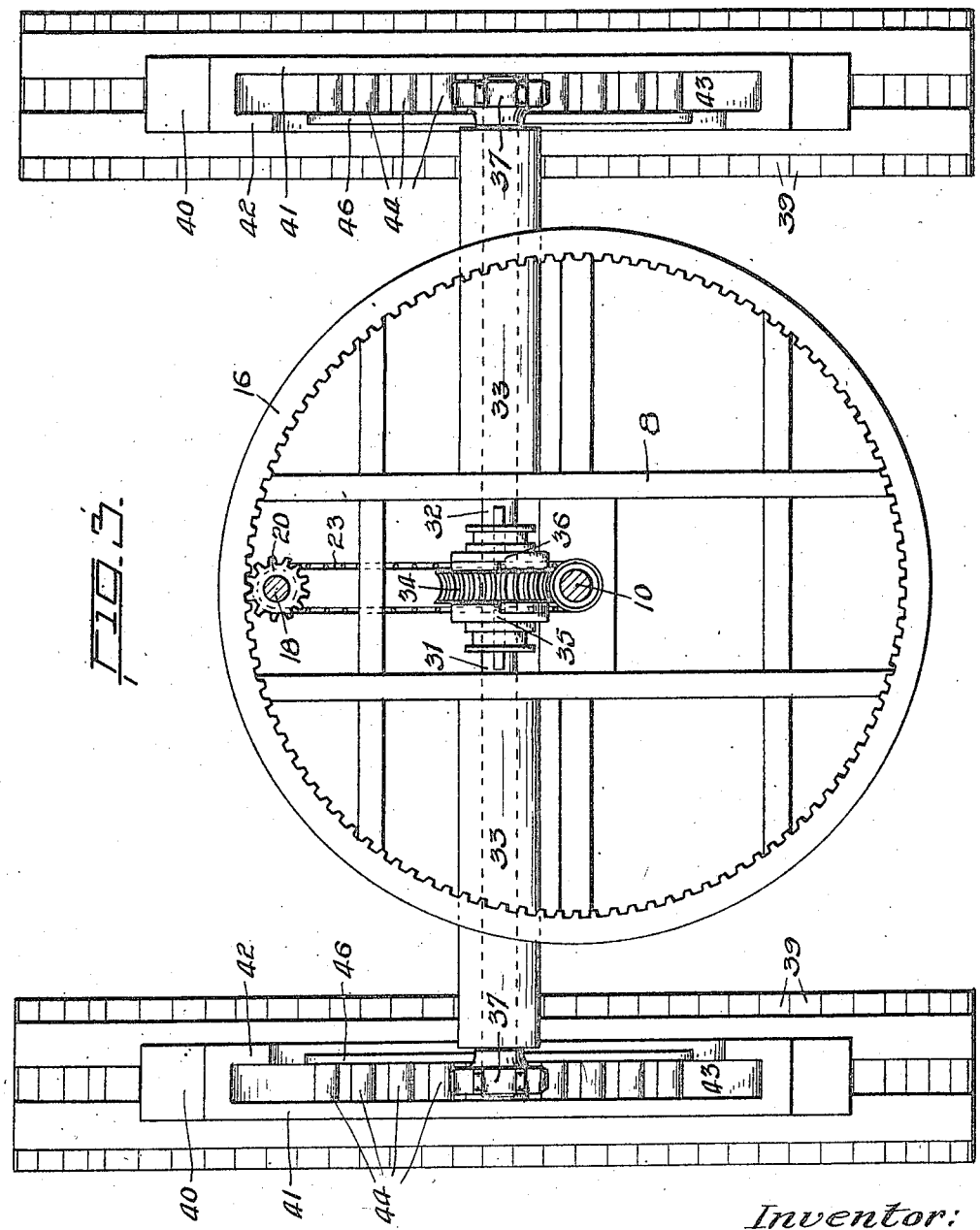

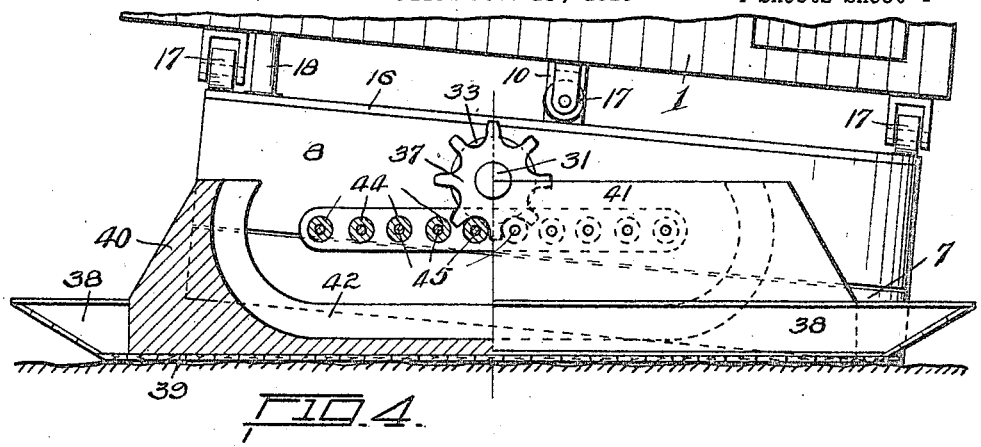
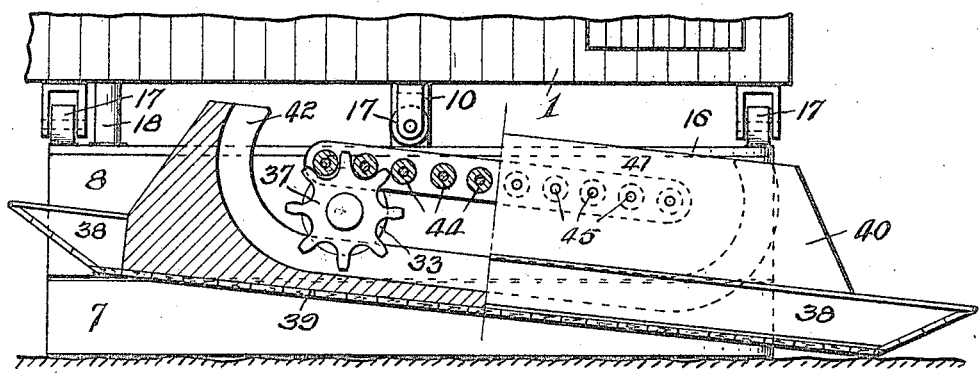
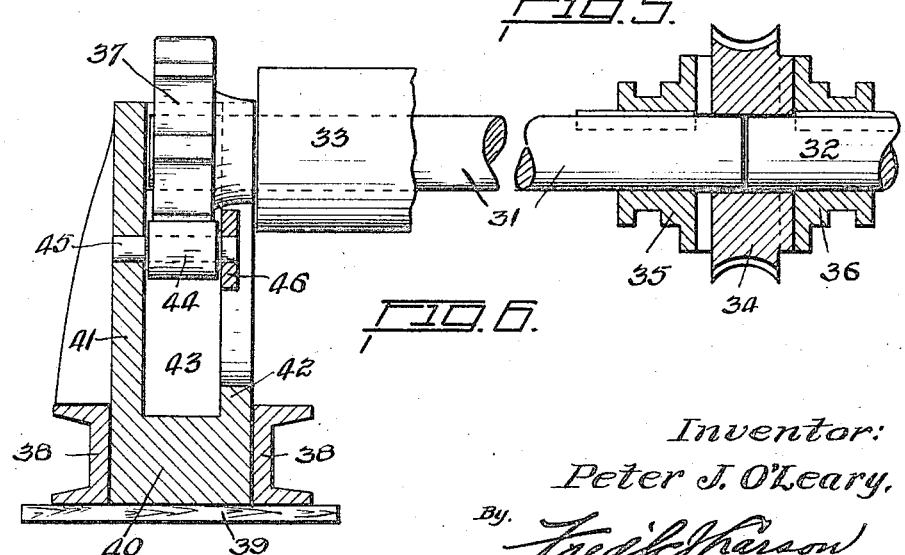

1,479,249

UNITED STATES PATENT OFFICE.

PETER J. O'LEARY, OF KANSAS CITY, MISSOURI.

PROPELLING MECHANISM FOR CONVEYING LOADS.

Application filed February 18, 1918. Serial No. 217,940.

*To all whom it may concern:*

Be it known that I, PETER J. O'LEARY, a citizen of the United States, resident of Kansas City, in the county of Wyandotte and State of Missouri, have invented a new and useful Propelling Mechanism for Conveying Loads, of which the following is a specification.

My invention relates to propelling mechanism for drag-line excavators, other apparatus or loads of any kind, and has for its object to overcome the objections and general defects in the present type of propelling mechanism or walking devices now in use, and, in general, to simplify and reduce the numbers of actual working parts to a minimum to secure a more positive propelling mechanism for such apparatus.

With the above and other objects in view, the invention consists in certain novel features of construction, arrangement and combination of parts, hereinafter more fully described and finally pointed out in the claims hereto appended.

Referring to the accompanying drawings forming a part of this specification wherein like characters of reference denote similar parts throughout the several views:

Fig. 1, is a side elevation of a drag-line excavator equipped with my improved propelling mechanism, the same being partly shown in section.

Fig 2, is a front end elevation thereof partly in section.

Fig. 3, is a plan view of the turn-table, base and propelling mechanism and connections.

Fig. 4, is a detail partly in section and partly in side elevation showing my improved propelling mechanism resting upon the ground, and the base, turn table and house being supported and advanced along portable rails establishing a track.

Fig. 5, is a detail partly in section and partly in side elevation showing the base resting upon the ground and the forward end of one of the portable rails elevated at one end prior to advancing the same to a new forward position.

Fig. 6, is a detail partly in vertial section of my improved propelling mechanism.

Referring to the drawings, 1 designates a suitable house such as ordinarily used in connection with excavating devices and similar apparatus. Mounted within the house 1 is a suitable source of power, such for instance as an internal combustion engine 2 adapted to drive the shaft 3 journaled in the bearings 4. Slidably mounted and keyed to the shaft 3 are a pair of suitable sliding gears 5 and 6, as clearly shown in Figure 1 of the drawings.

The particular house 1 or load as hereinafter understood and the mechanism carried therein are not essential to my invention, as it is a fact that any suitable apparatus and driving mechanism may be substituted for the house 1 and the mechanism carried thereby, as will be apparent hereinafter.

The preferable means for supporting the load 1 consists of a suitable base 7 which is adapted to normally rest upon the ground, as clearly shown in Figures 1 and 2.

A suitable turn-table 8 is preferably rotatably mounted upon the base 7 and suitable ball or roller bearings 9 may be interposed between the bottom of the turn table 8, and top of the base 7, to lessen the friction between the two devices when the turn-table 8 is in the act of revolving.

A suitable vertically disposed center-shaft 10 is supported in the center of the base 7, and turn-table 8, by means of suitable guide members 11 and 12 as shown in Figure 2. A collar 13 is fixed to the shaft 10 below the guide member 11 adapted to hold the base 7 and turn-table 8 in their proper united position. A suitable gear 14 is fixed to the upper end of shaft 10 and adapted to mesh with sliding-gear 6 when it is desired to drive shaft 10. A suitable worm 15 is fixed to the shaft 10 and is seated at one end upon the guide member 12, as shown in Figure 2.

A track-plate 16 is suitably secured to the turn-table 8 upon which a plurality of casters 17 carried by the house 1 are adapted to roll and thereby permit rotary movement of the house 1 upon the turn-table 8. The means for imparting a rotary movement to the house 1 upon the turn-table 8 consists of a shaft 18 journaled in the bearing 19. The lower end of the shaft 18 is provided with a gear 20 adapted to mesh with the teeth 21 formed upon the inner face of the track-plate 16. The upper end of the shaft 18 is provided with a suitable gear 22 adapted to be driven by means of the sliding-gear 5 when it is brought into mesh with gear 22, as is manifest.

I prefer to turn the turn-table 8 by means of a chain 23 riding over the sprocket 24 which is loosely mounted upon the center-shaft 10 and the sprocket 25. Sprocket 25 is fixed to the vertical shaft 26 journaled in the bracket 27. The bracket 27 is suitably fixed to the base 7. A pinion 28 is fixed to the upper end of shaft 26 and adapted to mesh with the internal gear 29 which gear is suitably fixed to the lower end of the turn-table 8. A sliding clutch 30 is carried by the lower end of the center-shaft 10 and is normally kept out of engagement with the sprocket 24, but when it is desired to rotate the turn-table 8, the sliding clutch 30 is moved up into engagement with the sprocket 24 for turning same, as is manifest.

The propelling mechanism for imparting a step by step movement to the base 7 and turn-table 8, and whatever apparatus or load is carried or supported by the turn-table, will now be fully set forth in its preferred form.

The propeller shaft consists preferably of two similar axles 31 and 32 journaled in the bearings 33, which bearings are fixed to and supported by the turn-table 8. These bearings are preferably adapted to project beyond the edge of the turn-table 8 any suitable distance, such as shown in Figures 2 and 3. A worm-gear 34 is preferably adapted to be loosely mounted upon the inner ends of the axles 31 and 32. Worm-gear 34 is adapted to mesh with the worm 15 which is fixed to the center-shaft 10 and be driven thereby for driving the axles 31 and 32. A sliding clutch member 35 is preferably carried by the inner end of axle 31 and a sliding clutch member 36 is also preferably carried by the inner end of the axle 32. When these sliding clutch members 35 and 36 are in engagement with the worm-gear 34, it will be seen that the axles 31 and 32 may be driven in unison, but when out of engagement with the worm-gear 34 the axles will stand still. Either one or both of the clutch members 35 and 36 may be moved out of engagement with the worm-gear at a time as is manifest. It may be desirable at times to rotate only one shaft at a time and this arrangement will permit of such operation.

It may be well to mention here that when ever it is desired to rotate the turn-table 8, upon the base 7, both clutch members 35 and 36 are moved out of engagement with the worm-gear 34 before the sliding clutch member 30 carried by the center shaft 10 is brought into engagement with the sprocket-wheel 24.

A suitable traction wheel, such as a cog-wheel 37 is fixed to the outer end of each axle 31 and 32, as clearly shown in Figure 3 and each traction wheel is adapted to roll on a portable rail forming a track, hereinafter set forth in detail, for the purpose of advancing the base 7, turn-table 8 and whatever apparatus or load is carried by the turn-table and further adapted to also advance or carry the rails to a new advanced position.

I prefer to construct the portable rails adapted to establish the track, as follows:

Each rail preferably consists of a pair of I-beams 38 mounted in suitable spaced relation upon a wooden tread 39. A suitable casting or rail 40 is suitably fixed to the beams 38 in any well known or preferred manner. Each rail 40 is provided with the outer wall 41, the inner flange wall 42 and traction wheel receiving chamber 43. It will be observed that the upper end and the inner side of the rail are open as clearly shown in Figures 1 and 6. A plurality of suitable rollers 44 or their equivalent are preferably rotatably mounted upon laterally projecting stub-shafts 45, which shafts are in turn suitably carried by the outer wall 41 of the rail 40. The inner end of each stub-shaft 45 carries a guide-plate 46, as shown in Figures 1 and 6.

The traction wheels 37, it will now be observed from Figure 4, are adapted to roll over the roller track in advancing the base 7, turn-table 8 and its load to a new position or station, and after repositioning same at the advanced station the traction wheels revolve under the rollers 44 thereby tilting the rails and advancing them to a new advanced position or station. It will thus be seen that a step by step movement is set up by the use of the rails and the base.

When the entire apparatus is standing still or stationary, it will be observed that the base 7 is resting flat upon the ground and likewise the portable rails, as clearly shown in Figure 1. The traction wheels 37 may rest at the rear end of tracks, as clearly shown in Figure 1 when the apparatus is stationary or they may rest at the opposite end of the roller tracks as may be desired.

Any suitable locking means, such as 47, may be employed to hold the turn-table 8 in a fixed position with the base 7, as shown in Figure 2.

It will be observed by referring to Figure 1 of the drawings that if power is applied to the traction wheels 37 they will immediately begin to climb up upon the rollers 44 thereby lifting the forward end of the base and carry the load forward, as clearly shown, in detail, in Figure 4, lower the base when completing their travel upon the roller track and finally raise the portable traction rails 40 into an inclined position and carry them forward to a horizontal or flat position again ready to support the traction wheels and load for advancing the load another time.

What I claim is:

1. The combination, with a base carrying a load, of a pair of portable side traction rails, a roller track carried by each rail and propelling means in the form of pinions supported by said base adapted to ride over and under the track of each rail for tilting, carrying forward and setting down the base and rails alternately to establish a step by step movement.

2. The combination, with a base carrying a load, a pair of portable side traction rails, a roller track supported by each rail, propelling means supported by the base adapted to ride upon and under the track of each traction rail to cause the traction rails to be tilted, moved forward and set down, for conveying the base and its load from one station to another through a step by step movement.

3. A rail, a pair of which establish a portable track upon which loads may be conveyed by means of a step by step movement, comprising a foot having a tread base, a shank having an open top and side and provided with a chamber within which a propeller is adapted to roll in a fixed orbit and means carried by the shank upon which the propeller may roll horizontally in a straight path a fixed distance.

4. In a machine of the class described, the combination of a base, a turn-table rotatably mounted upon said base, propelling mechanism carried by the turn-table, said mechanism comprising a pair of toothed traction wheels, a pair of portable rails constituting tracks and a flat roller rack supported by each rail upon which said traction wheels are adapted to roll for advancing the base and turn-table, said traction wheels when they have traveled the full length of the racks and upon the same being adapted to raise and advance said portable rails by causing the roller racks to be moved forward upon and over the traction wheels.

5. In a machine of the class described, the combination of a base, a turn-table upon said base, a house rotatably mounted on said turn-table, propelling mechanism comprising a driving pinion positioned upon each side of the turn-table, a pair of cooperating portable rails, a roller rack supported by each rail for each driving pinion to roll around, said driving pinions adapted when rolling over the rails to tilt the base, turn-table and house, then advance the same to a new position and upon completing the advance to lower the base, turn-table and house so as to rest the base upon the ground while the rails constituting the track are tilted and advanced to a new position by means of the driving pinions revolving under the roller racks.

6. In combination in an excavator, of a source of power, power transmission mechanism, a base, a turn-table upon said base, a pair of portable rails, a roller rack carried by each rail, a drive shaft carried by the turn-table, driving pinions carried by said shaft adapted to advance the base when the driving pinions are revolving upon the roller racks and to advance the rails when the roller racks are advancing upon the driving pinions.

In testimony whereof, I have hereunto signed my name to the specification.

PETER J. O'LEARY.